Figure 1:
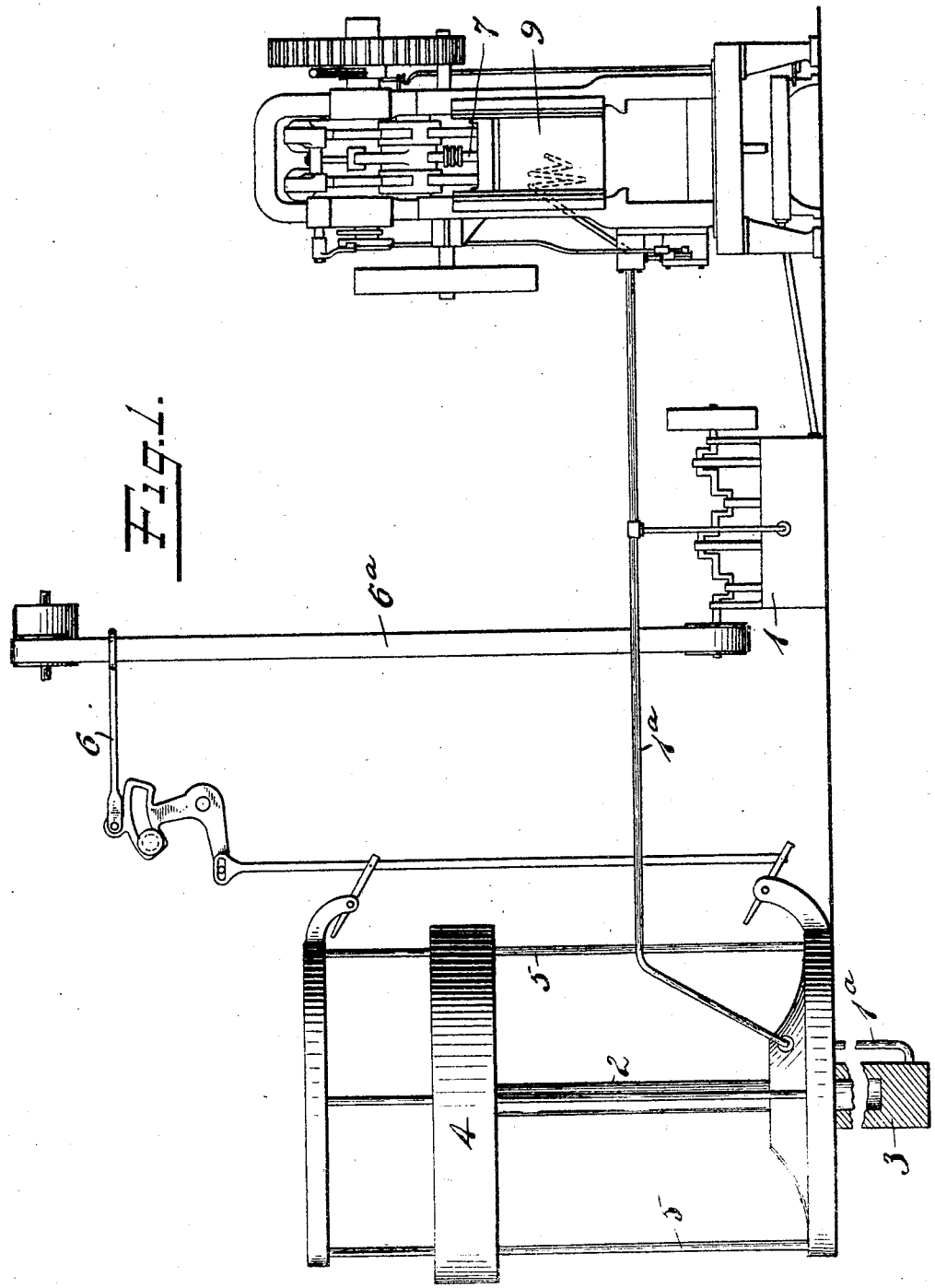

No. 795,019. PATENTED JULY 18, 1905.
K. BARTHELMES.
METHOD OF MANUFACTURING SEAMLESS KNOBS.
APPLICATION FILED OCT. 21, 1904.

4 SHEETS—SHEET 1.

No. 795,019. PATENTED JULY 18, 1905.
K. BARTHELMES.
METHOD OF MANUFACTURING SEAMLESS KNOBS.
APPLICATION FILED OCT. 21, 1904.

4 SHEETS—SHEET 2.

Witnesses
Chas. W. Pead
Geo. V. Rasmussen

Inventor
Kurt Barthelmes
By his Attorneys

No. 795,019. PATENTED JULY 18, 1905.
K. BARTHELMES.
METHOD OF MANUFACTURING SEAMLESS KNOBS.
APPLICATION FILED OCT. 21, 1904.

4 SHEETS—SHEET 3.

Witnesses
Chas. A. Peard
Geo. V. Rasmussen

Inventor
Kurt Barthelmes
By his Attorneys

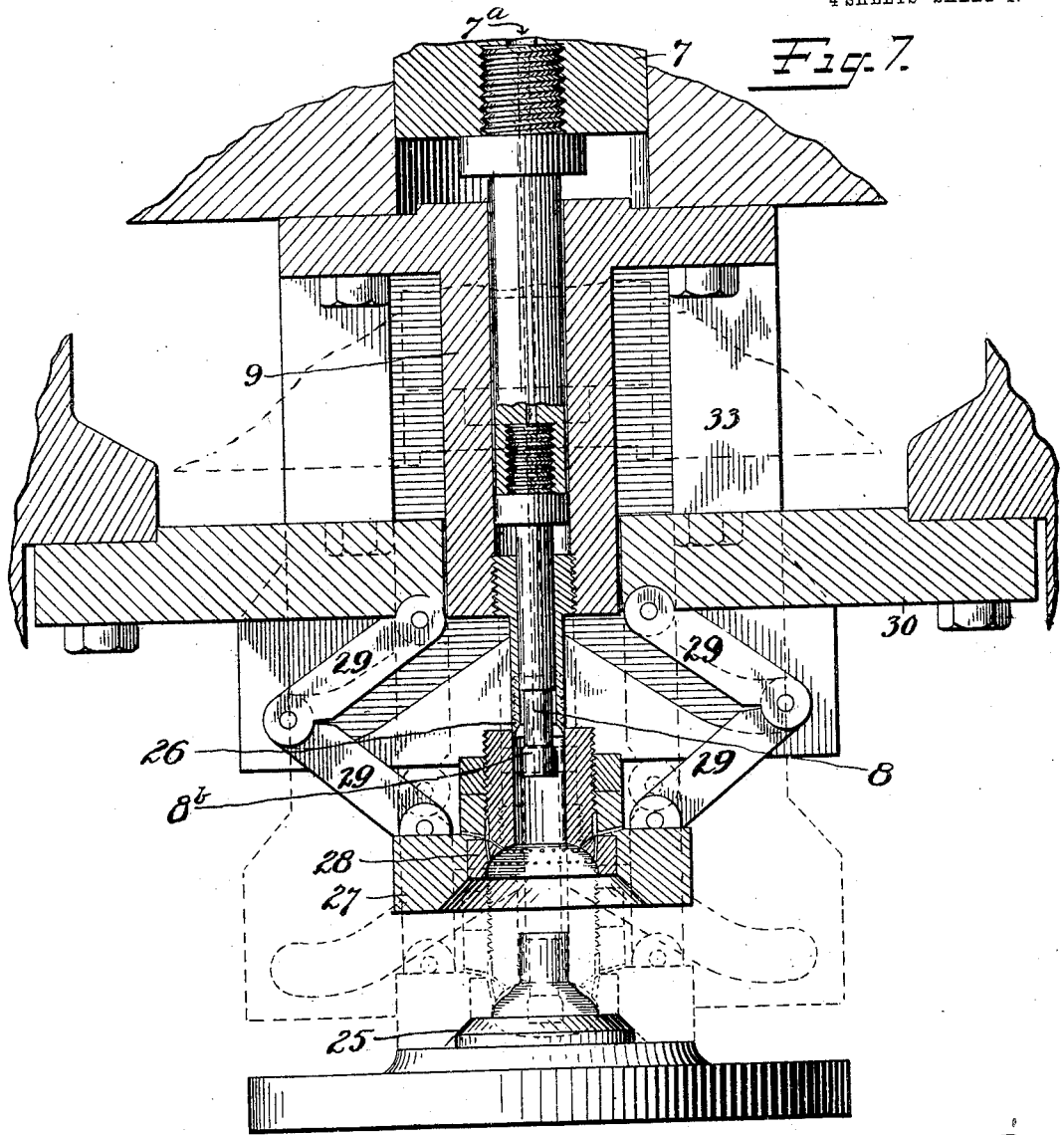

No. 795,019.                                              Patented July 18, 1905.

UNITED STATES PATENT OFFICE.

KURT BARTHELMES, OF NEW BRITAIN, CONNECTICUT, ASSIGNOR TO P. & F. CORBIN, OF NEW BRITAIN, CONNECTICUT, A CORPORATION OF CONNECTICUT.

METHOD OF MANUFACTURING SEAMLESS KNOBS.

SPECIFICATION forming part of Letters Patent No. 795,019, dated July 18, 1905.

Application filed October 21, 1904. Serial No. 229,468.

*To all whom it may concern:*

Be it known that I, KURT BARTHELMES, a citizen of the United States, residing at New Britain, Hartford county, Connecticut, have invented certain new and useful Improvements in Methods of Manufacturing Seamless Knobs, of which the following is a full, clear, and exact description.

My invention relates to my improved process or method of manufacturing seamless knobs.

The main object of my invention is to provide a new method for the manufacture of seamless knobs whereby such articles may be produced with rapidity, certainty, and uniformity.

In carrying out my process I employ dies which draw the metal in such a manner as to lay the fibers in a direction to resist more successfully the natural strain to which the drawn part of the article is subjected. I also simultaneously reinforce the interior of the blank from which the knob is made in such a manner that the pressure therein against the inner wall resists any tendency on the part of the machine to buckle or distort the metal while the drawing process is going on.

The foregoing and other advantages will be apparent to a mechanic skilled in the art after a reading of the following description.

Figure 2:
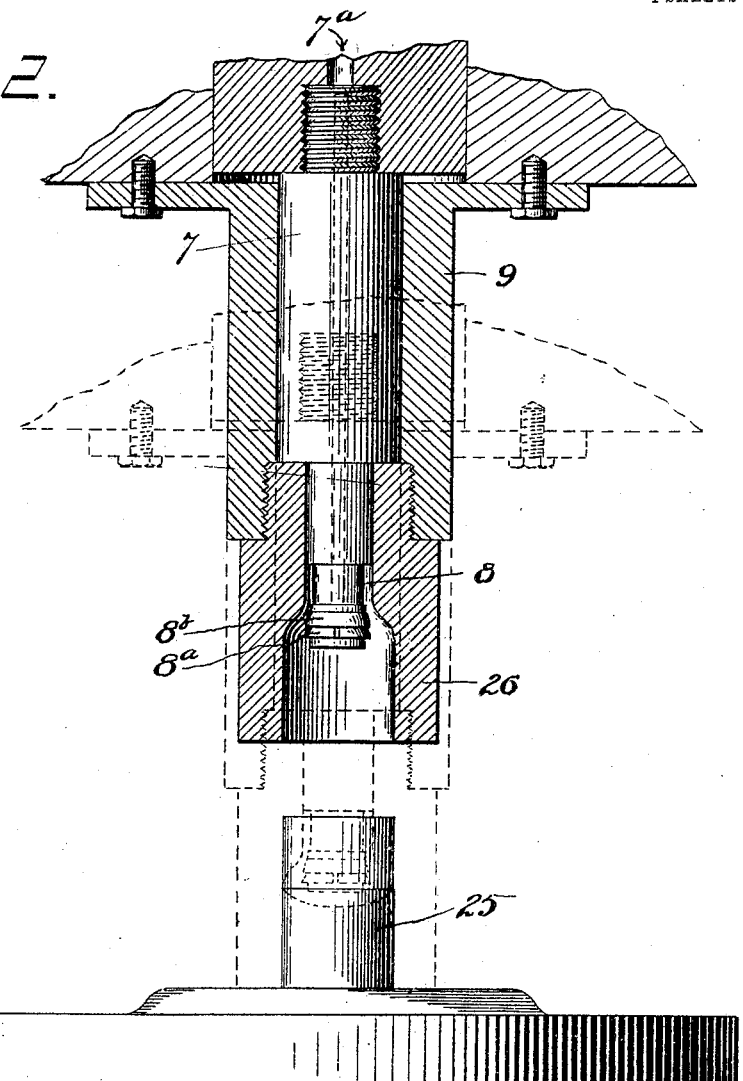
Figure 3:
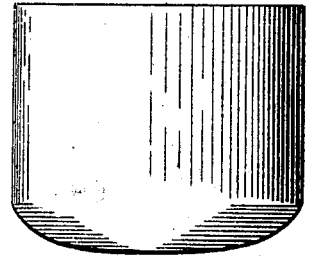
Figure 4:
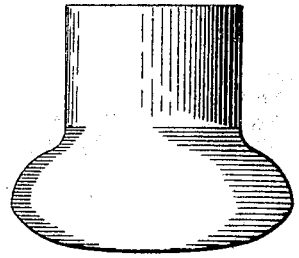
Figure 5:
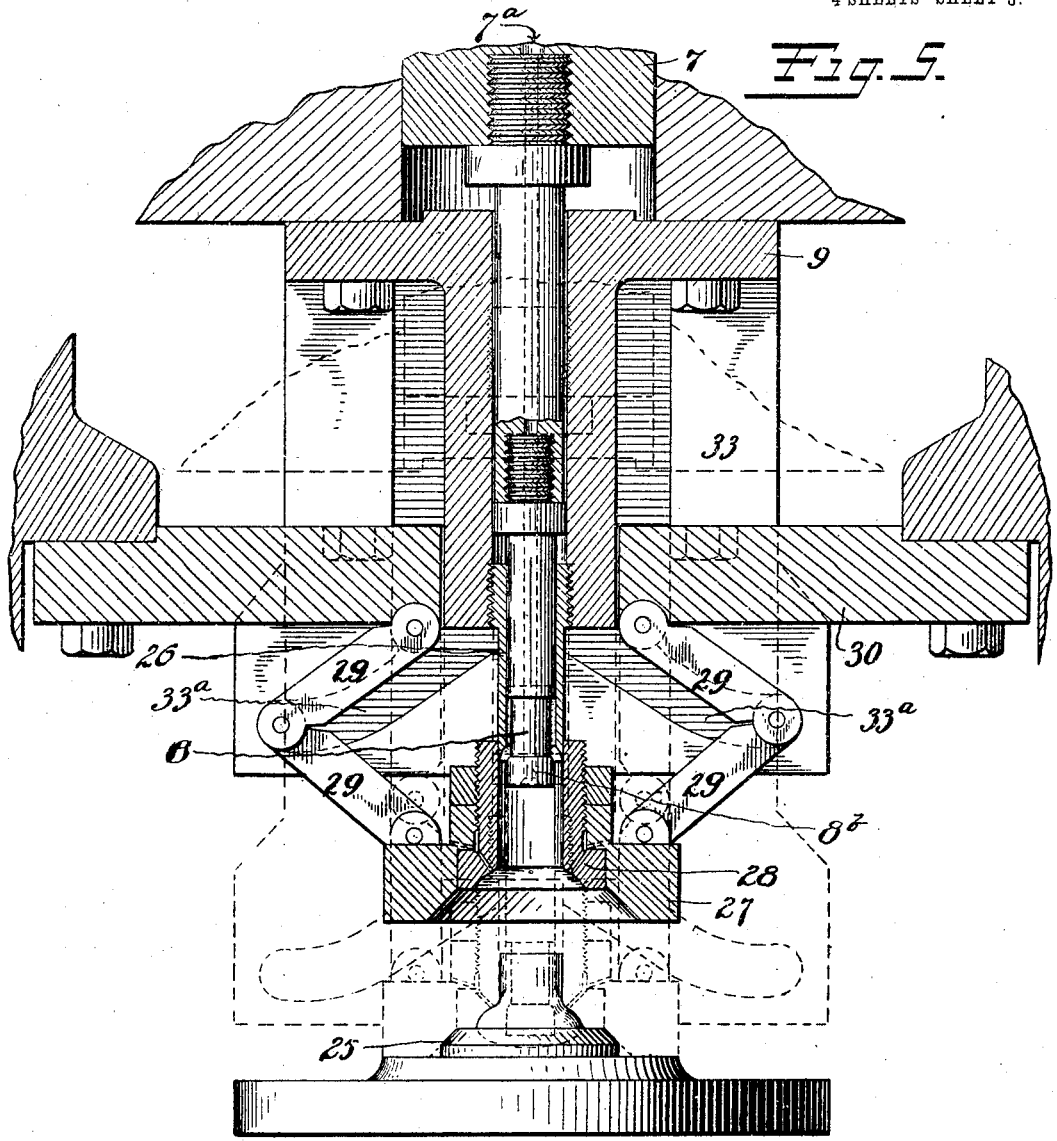
Figure 6:
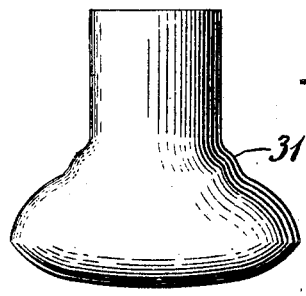

In the accompanying drawings, Figure 1 is a diagrammatic view of suitable apparatus which may be employed by me in producing knobs. Fig. 2 is a sectional view of certain parts detached and relatively enlarged. Fig. 3 is a side elevation of a blank such as employed by me in producing a knob. Fig. 4 is a side elevation of the article produced by the use of the apparatus shown in Fig. 2. Fig. 5 is a sectional view of certain parts detached and relatively enlarged. Fig. 6 is a side elevation of the article produced by the use of the apparatus of Fig. 5. Fig. 7 is a side elevation of certain parts detached and relatively enlarged. Fig. 8 is a sectional view of the article produced by the apparatus of Fig. 7. Fig. 9 is an outline of the article of Fig. 6, illustrating in dotted lines how the same is transformed in shape by the apparatus illustrated in Fig. 7.

The apparatus illustrated herein is referred to for the purpose of showing one form of apparatus which may be employed by me in carrying out my invention. This apparatus is made the subject-matter of a separate application filed by me, and hence need not be described in detail herein. Before describing said apparatus a brief outline of the method or process will be given.

I first take a cup-shaped blank, (which may be easily formed in any well-known manner and which conforms generally in outline to the blank shown in Fig. 3.) I then apply to the sides of said blank, at the open end thereof, a pressure sufficient to draw in or contract the side wall thereof to form a shank of relatively reduced diameter. Simultaneously with this operation I reinforce the interior of the blank by liquid under heavy pressure, which liquid, in effect, performs the function of a mandrel, preventing the improper collapse of the side walls of the blank, and to that extent coöperating with the die which is applied to the external wall. By this means not only may the shank of the article be formed to correspond to the shape and size of the die, but I am also enabled to utilize the pressure of the fluid or liquid within the blank for the purpose of actually distending the side walls thereof to correspond to some desired outline. In this latter case I employ what I term a "holder-die," which stands over the knob and is given the shape that it is desired the article shall assume. When the holder-die is in place, the liquid or fluid introduced into the article or blank, being under very heavy pressure, forces out the side walls until they fit into and conform to the contour of the pattern of the holder-die. Incidental to the process I may also employ means for drawing and ironing out the interior of the shank, while the exterior is reinforced by the presence of the shank-shaping die.

Now, referring to the drawings and briefly describing the same, 1 represents a compressor of any suitable type by which fluid or liquid may be pumped through a pipe 1ª into what I term an "accumulator," wherein a heavy pressure upon the liquid is maintained.

2 is the piston of the accumulator, carrying a suitable weight or weights 4, which latter may be guided on rods 5. During the operation of the machine this weight is in a state of suspension, being supported by the liquid in cylinder 3.

6 is a belt-shifting device operating the driving-belt 6ª to shift it from a fixed pulley to a loose pulley, or vice versa, upon a driving-shaft, whereby the compressor 1 may be started or stopped at will. The operation of the belt-shifter is effected by the movement of the weight 4.

The pipe 1ª leads not only from the compressor 1 to the accumulator, but it also leads to the press in which the knob is formed. The connection of this pipe with the press is such that it supplies liquid through the conduit 7ª in plunger 8 to the blank which rests upon a suitable support 25. This plunger 8 is carried by what I term an "inside gate" 7, which latter is moved up and down by suitable powerful cams, illustrated and described in detail in my copending application.

9 is what I term an "outside gate," which is arranged to carry the shank-shaping die 26. The plunger 8 extends into the shank-shaping die 26, and in operation said plunger descends into the cup-shaped blank just before the side walls of the said blank are contracted by the contracted portion of the die 26. Liquid is fed into said blank through the plunger 8, and the die 26 when down acts as a stopper to prevent the overflow of the same. Particularly is this true when the die 26 is in the act of contracting the side walls of said blank. As shown in Fig. 2, the lower end of the plunger 8 stands slightly below the contracted portion of the die 26. When the die 26 is contracting the side walls, the heavy pressure of liquid, determined by the amount of weight at 4, reinforces the interior of the knob-blank. When the die 26 has descended to the position indicated in dotted lines, Fig. 2, the blank will assume the outline shown in Fig. 4. As described in my accompanying application, the plunger 8 is then elevated in advance of the die 26. On the end of the plunger 8 is an enlargement or drawing-head 8ᵇ and also a split ring 8ª, the diameter of which when compressed is such as to snugly fit the interior of the shank of the knob or article thus produced. As a consequence, when said plunger is elevated said enlarged portion will tend to iron out and smooth the interior wall of said shank. When the split ring 8ª has been withdrawn from the article, the die 26 is caused to rise more rapidly than the plunger 8. Hence the ring 8ª will act as a stripper. If it is desired to still further reduce the diameter of the knob-shank, I may substitute in place of the die 26 another (see Fig. 5) of smallest internal diameter as compared with the smallest internal diameter of the former. In this case it is obvious that a smaller plunger 8 should also be substituted. Since the entrance to die 26 should necessarily be tapered to cause the end of the shank to enter the contracted portion of the die, it is obvious that the article produced by the action of the die 26 of Fig. 5 will assume an outline substantially as shown in Fig. 6, in which an annular bead or enlargement 31 will occur between the shank and the grip portion of the knob, said annular bead or enlargement corresponding to the shape of the tapered entrance of the die 26.

As shown in Fig. 5, 28 is a die carried by the holder 27, which in turn is hung from a stationary part of the press by toggle-levers 29 29. The ends of the toggle-levers may bear antifriction-rollers which project into grooves in end plates 33, carried by the outer gate 9. The lower ends of the grooves 33ª in said plates flare outwardly, as shown in Fig. 5, while the upper ends of said gooves are vertical. When the outer gate 9 moves down, the plates 17 move with it. During the first part of the movement the toggle-levers will be straightened out, throwing down the holder 27 and die 28 rapidly in advance of the shank-shaping die 26. When the toggle-levers are straightened out, the holder-die will assume the position indicated in dotted lines directly over and around the blank. The further downward movement of the outer gate 9 will not alter said position, since the end rolls on the toggle-levers will then stand in the path of the vertical portion of the grooves. Further downward movement of the gate will, however, carry down the shank-shaping die 26, which will then contract the shank. As before, the plunger 8 will enter the blank before the shank is contracted and when withdrawn will draw and iron out the latter. The die 26 of Fig. 5 will produce in the article the bead 31, which may be taken out by employing the force of the liquid within the blank as a means to distend or blow out the side walls thereof to correspond to the holder-die 28, the shape of which may correspond to the desired final shape of the article. In the drawings I have shown in Fig. 7 further means for reducing the diameter of the shank, and hence I have not shown the holder-die 28 of Fig. 5 of a shape corresponding to the final shape of the grip portion of the knob. The parts shown in Fig. 7 operate substantially as the corresponding parts in Fig. 5, save that in addition the shape of the die 28 is such as to cause the grip portion of the knob to assume the desired final outline, the latter being blown out or distended by the powerful hydraulic pressure within the knob.

In Fig. 7, 9 is the outer gate as before, and 7 the inner gate. 33 is a guide-plate for the toggle-levers 29 29. 8 is a plunger of smaller diameter than before. 26 is the shank-shaping die of smaller diameter than before. 27 is the holder as before, and 28 the holder-die. In the holder-dies of both Figs. 5 and 7 there are small outlet-passages shown in said views, through which any liquid may pass that is contained between the inner wall of the said die and the external wall of the grip portion of the knob. The function of the parts as shown in Fig. 7 is to give the knob its final form. To illustrate the transformation produced by the apparatus of Fig. 7, I have indicated the same by dotted lines in Fig. 9. In Fig. 8 the final outline of the knob is indicated in section. In this figure the bead 32, formed by the die 26, may be retained as an ornament, although of course this is not imperative.

What I claim is—

1. The method of manufacturing seamless knobs, comprising first forming a cup-shaped blank, then reducing the diameter of the open end of the blank to form a knob-shank and simultaneously reinforcing said blank on its interior with liquid under heavy pressure.

2. The method of manufacturing seamless knobs, comprising first forming a cup-shaped blank, then reducing the diameter of the open end of the same to form a knob-shank of reduced diameter, simultaneously reinforcing said blank on its inside by liquid under heavy pressure, the pressure of said liquid being sufficient not only to reinforce but also to distend the side walls of said blank.

3. The method of manufacturing seamless knobs, comprising first forming a cup-shaped blank, then reducing the diameter of the open end of the same to form a knob-shank of reduced diameter, simultaneously reinforcing said blank on its inside by liquid under heavy pressure, the pressure of said liquid being sufficient not only to reinforce but also to distend the side walls of said blank and inclosing said blank with an external reinforcement of the proper design before said pressure is applied to the interior of said blank.

4. The method of manufacturing seamless knobs comprising first forming a seamless cup-shaped blank, then reinforcing the same externally, then contracting the side walls of said blank at the open end simultaneously applying sufficient pressure of liquid within the blank to distend the side walls thereof to give to the bulbous portion of the knob the desired outline.

5. A method of manufacturing knobs from cup-shaped blanks comprising reinforcing the interior of the blank by liquid under heavy pressure, then contracting one portion of the blank while the same is reinforced from within by said liquid, and simultaneously distending another portion of said blank by the expansive force of the internal hydraulic pressure.

Signed at New York city, New York, this 19th day of October, 1904.

KURT BARTHELMES.

Witnesses:
R. C. MITCHELL,
L. VREELAND.